US005506946A

United States Patent [19]

Bar et al.

[11] Patent Number: 5,506,946

[45] Date of Patent: Apr. 9, 1996

[54] SELECTIVE COLOR CORRECTION

[75] Inventors: Abraham Bar, Palo Alto; Guy Morag, Sunnyvale, both of Calif.

[73] Assignee: Electronics For Imaging, Inc., San Mateo, Calif.

[21] Appl. No.: 324,161

[22] Filed: Oct. 14, 1994

Related U.S. Application Data

[63] Continuation of Ser. No. 771,368, Oct. 1, 1991, abandoned.

[51] Int. Cl.$^6$ .......... G03F 3/08

[52] U.S. Cl. .......... 395/131

[58] Field of Search .......... 395/125, 128–132; 358/80; 345/22

[56] References Cited

U.S. PATENT DOCUMENTS

| | | | |
|---|---|---|---|
| 4,975,861 | 12/1990 | Fujimoto | 364/521 |
| 5,103,407 | 4/1992 | Gabor | 395/131 |
| 5,130,935 | 7/1992 | Takiguchi | 358/80 |
| 5,212,546 | 5/1993 | Arazi et al. | 358/80 |

OTHER PUBLICATIONS

MacDraw II User's Guide, from Claris Corporation of Santa Clara, California, 1991, pp. 6–11.
Adobe Photoshop TM from Adobe Systems Corporation from Mountain View, California pp. 67–73, 1991.
Adobe Photoshop Tutorial from Adobe Systems Corporation from Mountain View, California pp. 51–52, 1991.
PaintWorks Gold TM from Activision of Mountain View, California, 1987, pp. i–iii, 55, 128, 129.

*Primary Examiner*—Phu K. Nguyen
*Attorney, Agent, or Firm*—Blakely, Sokoloff, Taylor & Zafman

[57] ABSTRACT

A method and apparatus for modifying colors in an image displayed on a display device by a computer controlled display system. The method includes selecting at least one color being representative of at least one pixel of the image, where the image includes a plurality of pixels on the display device; determining the colorimetric values for the at least one color; selecting a second color and determining the colorimetric values for the second color; and modifying the colorimetric values of a plurality of pixels in said image such that for any given pixel of the plurality of pixels having colorimetric values being matched to the colorimetric values of the at least one color, then the colorimetric values of the given pixel are modified to match the colorimetric values of the second color. The apparatus of the invention includes a display device; a cursor positioning device; a plurality of smoothed, look-up tables to provide a selection of a region of a color space, which selection is representative of a portion of said image near the at least one color; memory for storing data representative of the region and a second color; and a data processing unit. The method and apparatus allow a selection and automatic modification of a group of colors while maintaining the relationship among the colors so as to appear relatively the same with respect to texture and tonality.

50 Claims, 13 Drawing Sheets

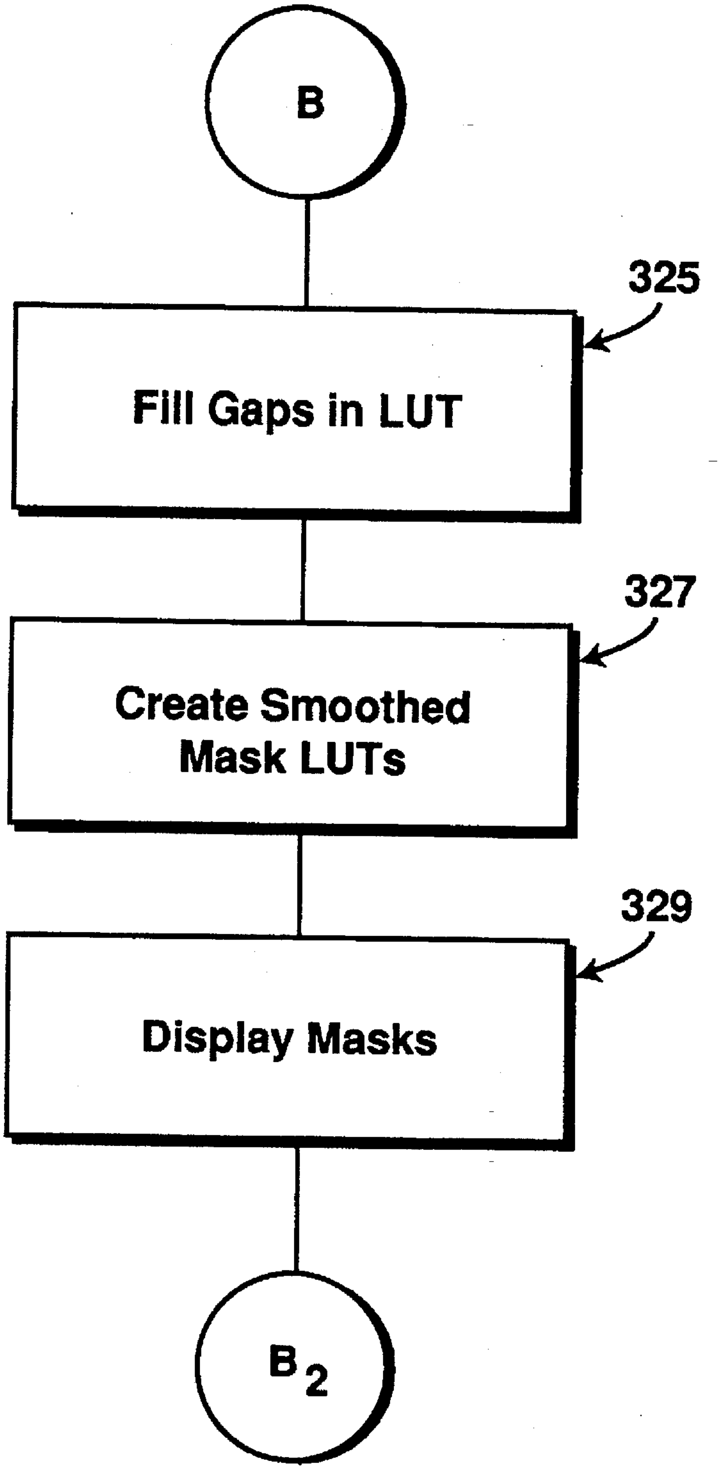
Figure 3b (contd.)

| L IN | LUT OUT |
|---|---|
| 0 | 0 |
| 1 | 0 |
| ⋮ | ⋮ |
| 254 | 0 |
| 255 | 0 |

410a 410b

402

| H IN | LUT OUT |
|---|---|
| 0 | 0 |
| 1 | 0 |
| ⋮ | ⋮ |
| 1022 | 0 |
| 1023 | 0 |

403

| S IN | LUT OUT |
|---|---|
| 0 | 0 |
| 1 | 0 |
| ⋮ | ⋮ |
| 254 | 0 |
| 255 | 0 |

| L IN | LUT OUT |
|---|---|
| 0 | 0 |
| 1 | 0 |
| ⋮ 59 | ⋮ 0 |
| 60 ⋮ 80 | 1 ⋮ 1 |
| 81 ⋮ 255 | 0 ⋮ 0 |

422

| H IN | LUT OUT |
|---|---|
| 0 | 0 |
| 1 | 0 |
| ⋮ 389 | ⋮ 0 |
| 390 ⋮ 410 | 1 ⋮ 1 |
| 411 ⋮ 1023 | 0 ⋮ 0 |

423

| S IN | LUT OUT |
|---|---|
| 0 | 0 |
| 1 | 0 |
| ⋮ 79 | ⋮ 0 |
| 80 ⋮ 100 | 1 ⋮ 1 |
| 101 ⋮ 255 | 0 ⋮ 0 |

Figure 4c

L LUT 431

| IN | OUT |
|---|---|
| 0 | 0 |
| ⋮ | ⋮ |
| 59 | 0 |
| 60 | 1 |
| ⋮ | ⋮ |
| 80 | 1 |
| 81 | 0 |
| 82 | 1 |
| ⋮ | ⋮ |
| 90 | 1 |
| 91 | 0 |
| ⋮ | ⋮ |
| 255 | 0 |

H LUT 432

| IN | OUT |
|---|---|
| 0 | 0 |
| ⋮ | ⋮ |
| 389 | 0 |
| 390 | 1 |
| ⋮ | ⋮ |
| 414 | 1 |
| 415 | 0 |
| ⋮ | ⋮ |
| 1023 | 0 |

S LUT 433

| IN | OUT |
|---|---|
| 0 | 0 |
| ⋮ | ⋮ |
| 65 | 0 |
| 66 | 1 |
| ⋮ | ⋮ |
| 74 | 1 |
| 75 | 0 |
| ⋮ | ⋮ |
| 79 | 0 |
| 80 | 1 |
| ⋮ | ⋮ |
| 100 | 1 |
| 101 | 0 |
| ⋮ | ⋮ |
| 255 | 0 |

| L IN | LUT OUT |
|---|---|
| 0 | 0 |
| ⋮ | ⋮ |
| 59 | 0 |
| 60 | 1 |
| ⋮ | ⋮ |
| 80 | 1 |
| 81 | 1 |
| 82 | 1 |
| ⋮ | ⋮ |
| 90 | 1 |
| 91 | 0 |
| ⋮ | ⋮ |
| 255 | 0 |

| H IN | LUT OUT |
|---|---|
| 0 | 0 |
| ⋮ | ⋮ |
| 389 | 0 |
| 390 | 1 |
| ⋮ | ⋮ |
| 414 | 1 |
| 415 | 0 |
| ⋮ | ⋮ |
| 1023 | 0 |

| S IN | LUT OUT |
|---|---|
| 0 | 0 |
| ⋮ | ⋮ |
| 65 | 0 |
| 66 | 1 |
| ⋮ | ⋮ |
| 74 | 1 |
| 75 | 1 |
| 76 | 1 |
| 77 | 1 |
| 78 | 1 |
| 79 | 1 |
| 80 | 1 |
| ⋮ | ⋮ |
| 100 | 1 |
| 101 | 0 |
| ⋮ | ⋮ |
| 255 | 0 |

SELECTIVE COLOR CORRECTION

This is a continuation of application Ser. No. 07,771,368, filed Oct. 1, 1991.

BACKGROUND OF THE INVENTION

The present invention relates generally to data processing of images and particularly to computer controlled processing of color or grey scale images displayed in a computer controlled display system.

Present computer systems provide many useful tools for displaying and processing color images, including those color images of natural scenes which may be obtained, for example, by photographing a natural scene and then by scanning the image into a color computer system. Graphic artists and others are increasingly using computers to prepare color images for reproduction in publications. In these circumstances, it is often necessary to process the color image in a computer system in order to improve the appearance of the image so that the final pre-press appearance of the image will produce acceptable reproductions in a publication. The processing of these images includes such standard prior art techniques as cropping, modifying the overall exposure of the image, modifying the overall color cast of the image (e.g. compensating for use of daylight film under incandescent lighting), and selective "painting" and touch-up of the images.

The touch-up or painting of images in a computer system is often done with the aid of a specialized computer program which is designed for manipulating color graphics; such computer programs include Adobe Photoshop™ from Adobe Systems Corporation of Mountain View, Calif., MacDraw™ from Claris Corporation of Santa Clara, Calif.; and other well known painting, drawing and photographic processing computer programs. These programs typically have a special capability which is often referred to as a "fill." The fill operation typically involves selecting a region of an image and then filling in that region with a selected color. This operation will completely flood the selected image with the new color thereby completely overwriting any prior color and consequently removing any shading or textures which appeared in the selected region The shading or textures is usually a result of slight differences in color across a small region of the image (it will be appreciated that small differences in grey scale shading will also have the same affect). These textures or shadings are destroyed in fill operations and thus it is often difficult to use a fill operation on an image of a natural scene due to the irregular shapes of objects (e.g. a tree) in nature which often appear in such natural scenes. Some computer programs, such as PaintWorks Gold™ from Activision of Mountain View. Calif., include the ability to exchange one color with another color. While this is somewhat more precise than a fill operation, this "exchange" operation does not preserve the shading and textures in a natural scene because there is a one for one exchange in going from a single color to another single color.

Other attempts in the prior art (e.g. Adobe Photoshop) to improve the region selection process and selective color modification process have included edge detection algorithms which attempt to determine the edge of an object in a natural scene, such as the edge of the sky formed by the viewer's perception of the sky meeting the horizon. These edge detection algorithms attempt to segment the image into regions by determining the natural boundaries of an object in a natural scene. Any modifications to that object can then be constrained to the interior of the edge as determined by the algorithm. Once the boundaries are defined, in this particular prior art operation, the only automatic modifications possible are, for example, of the hue (that is, color), which does not fully preserve the texture and shadings. In this prior art, manual color corrections are needed to modify the colors in a way that does preserve the texture and shadings. Therefore, assuming that the edge detection algorithm properly works (and it often does not) the automatic modification of natural images is typically not satisfactory.

While the prior art provides some methods for selectively improving the color of natural scenes as displayed on a computer system, the prior art does not provide a satisfactory automatic method for selectively modifying a range of colors which results in preserving a texture or shading (or a range of grey scale) in an image. Therefore, it is an object of the present invention to provide a method and apparatus for selecting a region in an image marked for modification, and for automatically modifying a first plurality of colors in an image displayed by a computer controlled display system on a display device so that the first plurality of colors is selectively modified to a second plurality of colors in a pleasing manner while retaining in the modification the shading and texture of that part of the original image and smoothly blending this modified part into the overall image, and at the same time improving the overall appearance of the image.

SUMMARY OF THE INVENTION

The present invention provides an apparatus and method which is useful for modifying a color in an image displayed by a computer control display system. The image is displayed on a display device of the computer system and is comprised by a plurality of pixels on the display device. The apparatus of the invention further includes a means for selecting at least one color which is representative of at least one pixel of the image, the means for selecting often being a cursor positioning device such as a mouse or a trackball. The apparatus further includes means for determining the colorimetric values for at least one color and a means for selecting a second color which is referred to as a target color and a means for determining the colorimetric values for the second color. The invention also includes a means for modifying the colorimetric values of a plurality of pixels in the image such that for any given pixel of the plurality of pixels which has colorimetric values being matched to the colorimetric values of the at least one color originally selected, then the colorimetric values of the given pixel are modified to match the colorimetric values of the second color. In other words, if the user selects initially at least one color (typically a plurality of colors will be initially selected) and then the user selects a target color or colors the apparatus of the invention will modify the colors initially selected so that they appear similar to the target color or colors. Thus, for example, if a yellowish flesh-tone source color is originally selected along with a flesh-tone color which is more orangish (indicating a greater amount of red) and which is in the region initially selected and then the user selects a more brownish flesh tone as the target color (for example, a tanned fleshtone), the apparatus and method of the present invention will modify the yellowish flesh-tone color to appear brownish flesh-tone (and hence have the colorimetric values of the brownish flesh-tone) and will modify the orangish flesh-tone color to have a redder brown flesh-tone color than the brownish flesh-tone color and the prior relationship (prior to modification) between these latter two colors will be preserved (to the extent that appearance is preserved) after modification.

The method of the present invention modifies a plurality of colors in an image by selecting at least one color which is representative of the plurality of colors in a first region of an image and then determines the colorimetric values for the at least one color in the first region of the image. Then the method selects a second color and determines the colorimetric values for the second color and modifies the colorimetric values of the first plurality of colors in the image to create a modified plurality of colors such that for any given color in the first plurality of colors having colorimetric values matched to the colorimetric values of the at least one color, then the colorimetric values of the given color are matched to the colorimetric values of the second color, and the colors in the modified plurality of colors has a similar relationship relative to each other as the colors in the first plurality of colors. This will preserve shading and textures in the original scene and allow the user to selectively color edit the image in order to improve the appearance the image.

The present invention further includes a way for the user to more easily select the region of the original image to be modified by pointing to the original source color which the user desires to modify and thus selecting and marking for modification all similar colors in the image, then adding to this selection simply by pointing at nearby colors not yet marked for modification. The present invention further includes a method for allowing the user to also geometrically constrain a selected range of colors in order to provide more control over the modification of an image. The present invention then enables the user to modify the colors in the selected part of an image by simply pointing to the target color which the user desires the selected colors to move towards.

BRIEF DESCRIPTION OF THE DRAWINGS

FIG. 3*a* shows the overall flow chart while FIGS. 3*b*, 3*c*, 3*d*, 3*e*, and 3*f* show details of the flow chart of FIG. 3*a*.

FIGS. 4*a*, 4*b*, 4*c* and 4*d* show look-up tables which are used as part of the present invention.

FIG. 8 shows a smoothing function which may be used to smooth the look-up tables of the present invention.

DETAILED DESCRIPTION OF THE PRESENT INVENTION

The present invention provides an apparatus and method for modifying selectively a color or plurality of colors in an image displayed by a computer controlled system. The following detailed description describes the preferred embodiment of the selective color modification system of the invention, but it will be clear upon reference to this disclosure that many modifications and alternative embodiments are possible. Numerous specific details, such as values for range, the number of pixels used in averaging a cursor location selection, the sequence of steps in the methods, etc. are provided for a detailed understanding of the present invention, and these specifics are merely implementation details which should not be construed as limiting the present invention. Many well known details concerning computer systems have not been described herein in order to prevent the description of the present invention from being obscured unnecessarily in detail.

Figure 1:
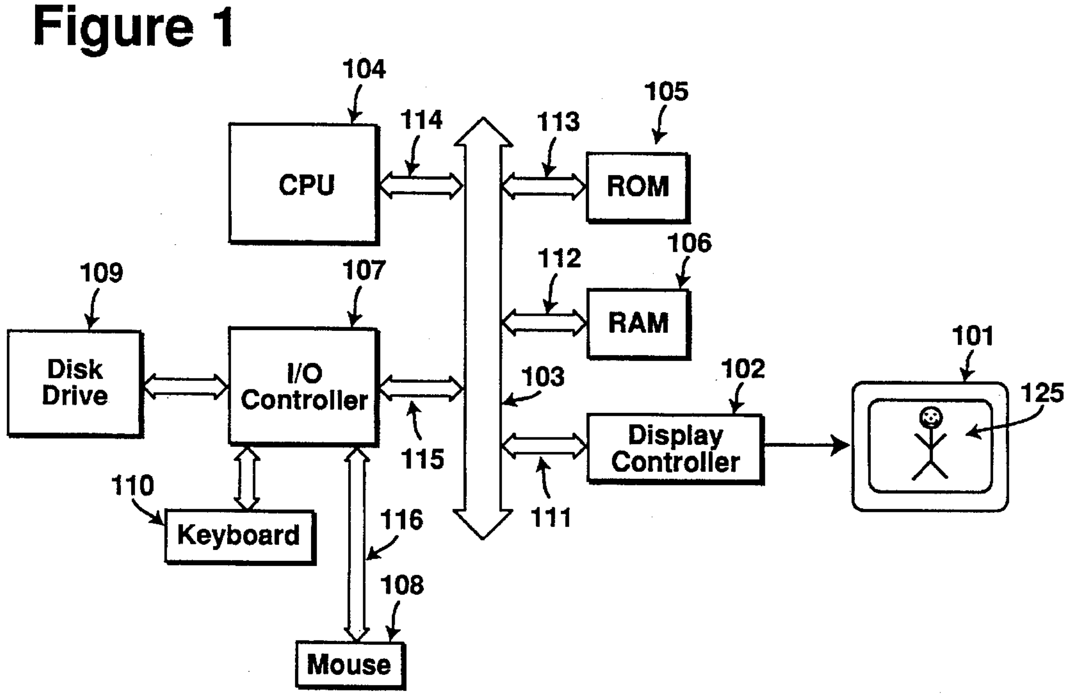
FIG. 1 illustrates a typical prior art computer system which may be used with the method and apparatus of the present invention.

The present invention typically operates on a computer controlled display system such as that system shown in FIG. 1. The computer system of FIG. 1 includes a display device 101 which may be a standard color CRT, a color LCD display device or some other display device. The image 125 is displayed on the display device 101 under the control of the computer system. The computer system includes a display controller 102 which couples the display device to the main system bus 103 which is itself coupled to the CPU 104 and the memory (RAM) 106 and the memory ROM 105. Input and output devices such as mouse 108 and disk drive 109 are also part of the computer system, and their input and output is controlled by an I/O controller 107 which couples the input and output through bus 115 to the rest of the computer system via system bus 103. The mouse 108 is one of many cursor positioning devices; other devices include cursor keys on the keyboard 110, a joystick, a trackball, an isobar, and other well known cursor positioning devices.

The image 125 is typically originally retrieved from the disk drive 109 by the operating system of the computer working in conjunction with the I/O controller 107. The image is transferred from the disk media in the disk drive 109 through the system bus 103 into the RAM 106, and then the CPU (e.g. a microprocessor) 104 then causes the image represented in the RAM to be read out via the display controller 102 into the display device 101 using well known techniques in the prior art. Typical operating systems allow a user to use a cursor positioning device, such as a mouse, to position the cursor on the screen in order to select regions in the image.

Figure 2:
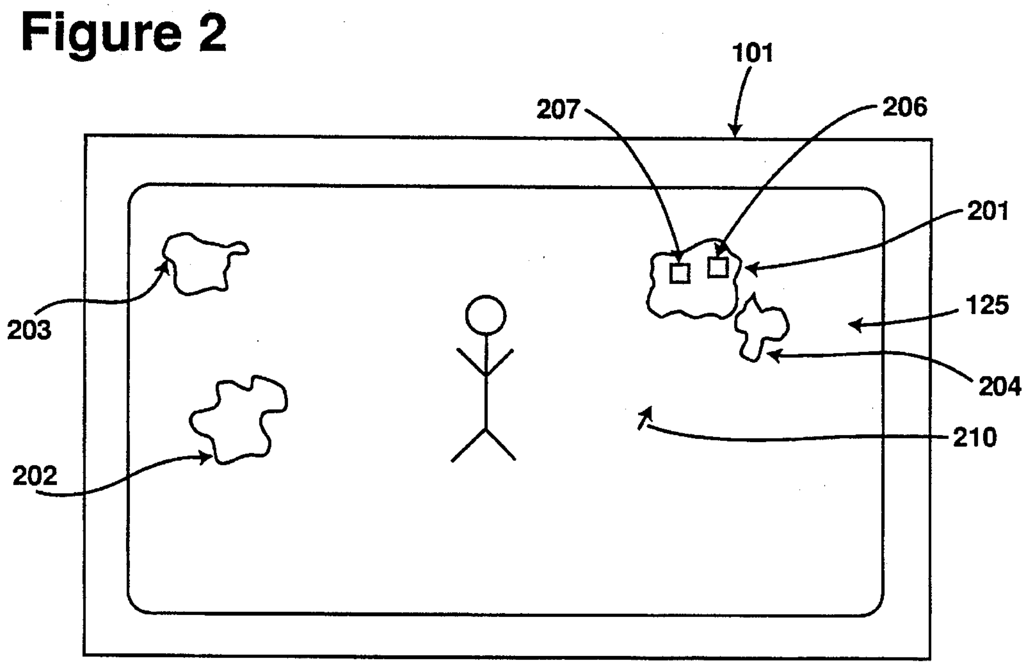
FIG. 2 shows an image being displayed in color on a display device controlled by a computer controlled display system.

The image 125 is shown in greater detail in FIG. 2. The display device 101 of FIG. 2 is displaying a natural image (e.g. a photographic picture of a person standing in a meadow near a forest). The cursor 210 is displayed as an overlay on the image, and several colored regions are also displayed. These regions include region 201 which surrounds regions 206 and 207 and also include regions 202 and 203 and 204. Assume for purposes of discussion that region 201 contains green and yellow green colors and that the region 207 contains a shade of yellow green which is more yellowish than the rest of region 201. Region 206 is the least yellowish of all the green and yellow green shades in region 201. Further assume that region 204 shows a more vivid (saturated) green that any green in region 201, and that region 202 includes greens from region 201 as well as region 204. Further assume that region 203 is representative of a blue sky and is hence largely a blue region.

The method of the present invention will now be described by referring to FIG. 2 and the flow chart in FIG. 3. During this description, the user will control the cursor positioning device to move the cursor into the region 201 to cause the cursor to overlap with that region. The user will then select the colors in that region as a source color by clicking on the mouse button while holding the cursor over a point in region 201, thus indicating to the computer that the color at the current location of the cursor should be selected as the source color. Suppose that the user first points to region 206 and clicks the mouse button. In addition, because upon inspection the user sees that not all of region 201 has been selected, the user repeats the click operation on another area not yet selected but also in region 201. This is repeated until all of region 201 is selected. Other means may be used to select the source color in region 201. Then the user will now move the cursor positioning device to the region 204 and will tell the computer to determine the colorimetric values for the colors in region 204 by clicking on the mouse button or by otherwise signalling to the computer to determine the information for the target color in region 204. The modification according to the present invention of the colors displayed in region 201 will cause most of the greens in region 201 to appear more vivid (more saturated) and hence closer to the target green color in region 204 Furthermore the shading and texture among the various greens and yellow greens in region 201 will be preserved such that the relative difference in the perception of greens between region 207 and region 206 will be preserved in that while region 207 and 206 will be more vivid (saturated) than before, the relative difference in how yellowish the greens in these two regions appear will be the same as before.

Figure 3A:
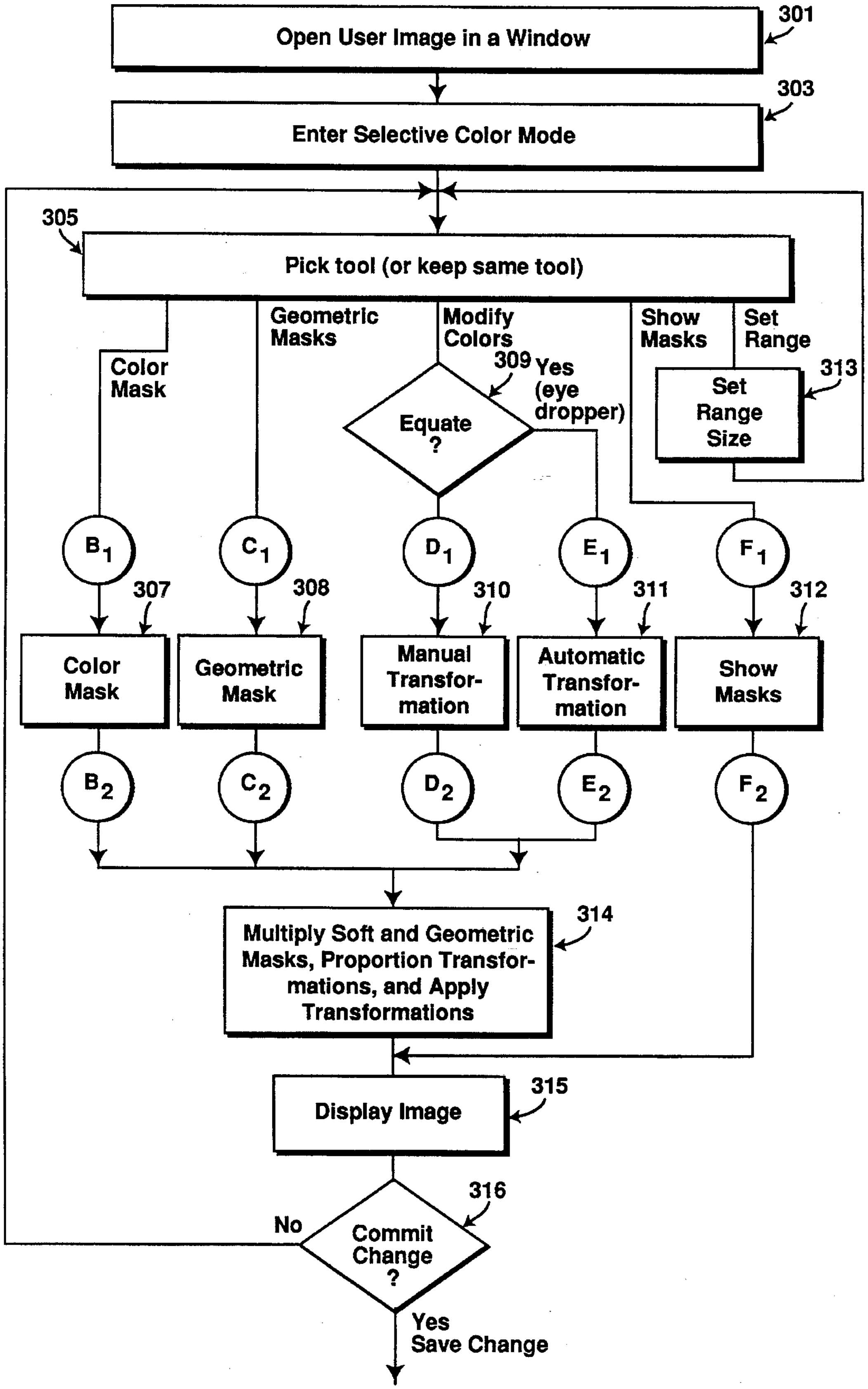
FIGS. 3*a*, 3*b*, 3*c*, 3*d*, 3*e*, and 3*f* show the flow charts which depict the method of the present invention

The method of the present invention begins in step 301 shown in FIG. 3*a*. In this step, the user opens the user image typically in a window. The image 125 in FIG. 2 is an example of such an image, as is the image 703 in FIG. 7. In step 303, the user enters the selective color mode which instructs the computer that the user will be selecting specific colors and modifying, those specific colors (rather than modifying the image as a whole, such as the exposure of the entire image). In step 305, the user selects what the next step in the procedure is from the choices of: 1) selecting a color mask in step 307. That is, selecting, the source color by selecting a range of colors to modify: 2) modifying the color mask by invoking a geometric constraint in step 308; 3) changing the colors in the selected region 4) invoking the "show" command in step 319 causing the region so far selected in the user image to be highlighted; 5) setting in step 313 the range size criterion for selecting the color mask.

Figure 3B:
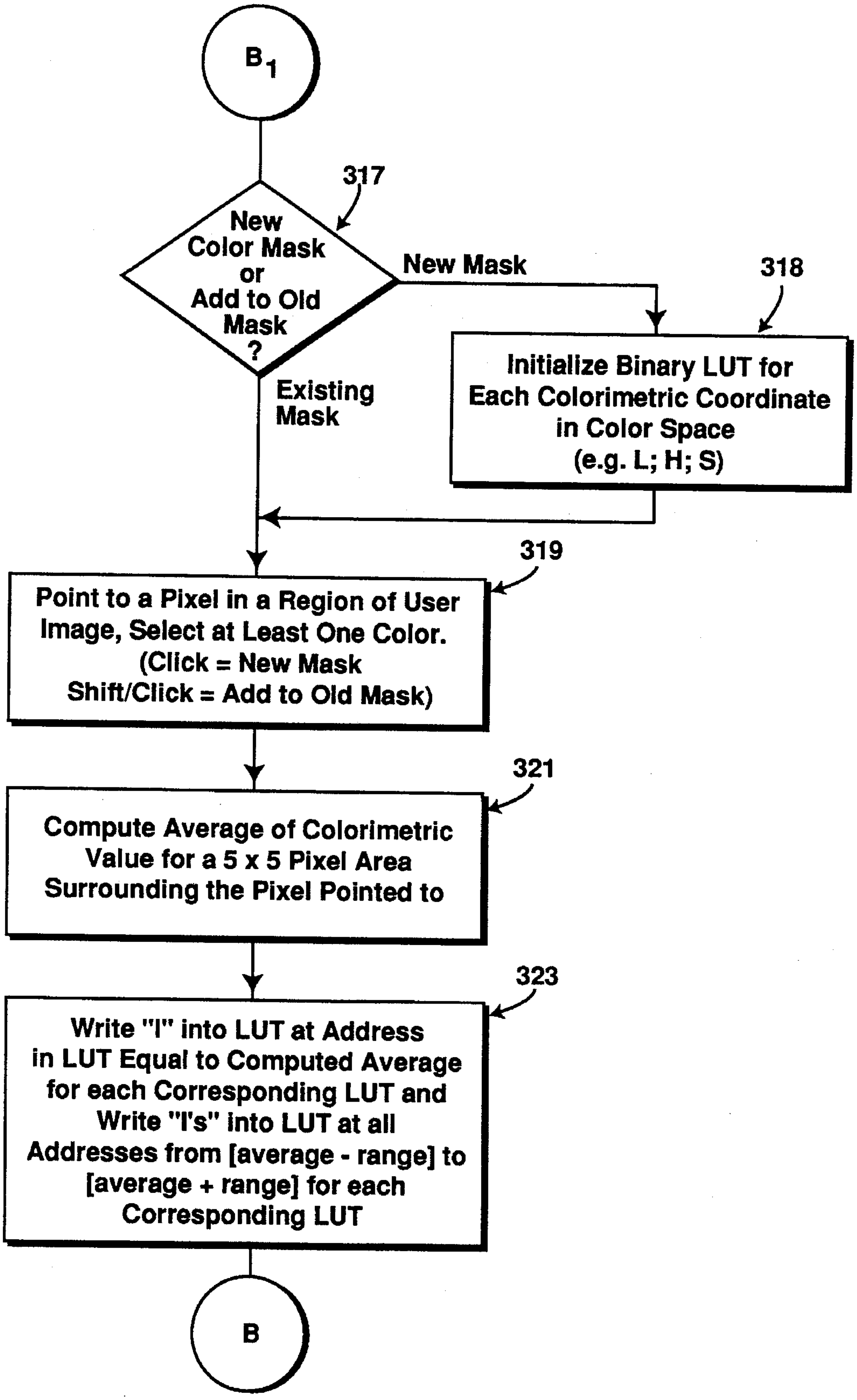

The detailed operation of choice 1, selecting the color mask (step 307), will now be described with the aid of FIG. 3B. The method first determines in step 317 if this is to add color points to a previous selection, indicated in the preferred embodiment of the present invention by the shift key being depressed when the mouse is clicked on a selection, or if this is to create a new mask, this being the initial condition and the condition after the user explicitly chooses the new selection option and the condition when the mouse button is clicked without the shift key being depressed. If this is a new mask, the method next creates, in step 318, an initialized binary look-up table for each colorimetric coordinate in the color space in which the computer is operating. These binary look up tables are called the color masks. In the preferred embodiment, the color space used is "LHS" color space, where L is the luminance "coordinate", and H represents the Hue coordinate and S represents the Saturation coordinate. It will be appreciated that for any color, the color will have the three colorimetric values L. H, and S. Other color spaces are well known, such as RGB, CIE-Lab, etc. and the present invention may be utilized with these color spaces; the modification of the present invention to work in these color spaces will be clear to those of ordinary skill in the art in that the necessary transformations between the color spaces will be used. The relationship of the LHS space used in the preferred embodiment of the present invention with coordinates L, H, and S, and the CIE-Lab color space with coordinates L* , a* , and b* is approximately that L and L* are identical and for any L, a* and b* are rectilinear coordinates of a plane whereas H and S are the angle and radius, respectively, of the same plane. Mathematically, the approximate relationship is $L=L^*$, $H=\arctan(b^*/a^*)$, and $S=\{\mathrm{sqrt}[(a^*)^2+(b^*)^2]\}/L$ where sqrt[ ] is the square root operation.

Step 318 creates three look-up tables, one for each of the colorimetric coordinates in the DIS color space. FIG. 4*a* shows the three such initialized binary look-up tables (LUT). Specifically, look-up table 401 is for the L coordinate and comprises an input (address) side and an output side which is binary. Each entry in the table contains an input address such as address 410*a* and an output value which is binary value such as value 410*b*. The input side of the table represents the range of possible L values in the color space implemented on the computer system. In the preferred embodiment, the L color coordinate has a range of integer values from 0 to 255 such that any pixel may take on a luminance value anywhere from 0 to 255. As can be seen from the look-up table 402, the H value may be any integer from 0 to 1023. Finally, the S value may be any integer from 0 to 255, as shown in look-up table 403. The initialization process involves entering all zeros into the output side of each look-up table.

After creating the initialized binary look-up tables in step 318, the user may point to a pixel in a region of the user image to select at least one color. In this step 319, the user will typically manipulate a cursor positioning device to position the cursor 210 over the region to thereby point out that color with the cursor on the display. Depending on the operating system of the computer, the selection may occur by merely pointing at a pixel or by pointing at the pixel and pressing a button in order to signal to the computer that the current location of the cursor is the desired location. The present invention uses the operating system of the computer system to retrieve the cursor's location and the address of the pixel which has been selected, and then in step 321 the present invention determines the average of the colorimetric values for a region surrounding the pixel which was pointed to. In the preferred embodiment, a 5×5 pixel area surrounding the pixel which was pointed to is used in computing the average of the colorimetric values. The pixel which was pointed to is at the center of this 5×5 pixel area. The result of step 321 is an average of L, H, and S for the selected region. Previously, or by default, the invention determined the range of color selection: this range is typically set by the user in step 313 of FIG. 3*a* (although the present invention defines a default range of ten for the three coordinates in the LHS color space). This range determines how many adjacent colors are modified in the process of modifying one color. The selective color tool window 702 includes a read out 719 for the range currently set by the invention (see FIG. 7) If the user changes the ran,,e after a first color selection the range is modified only for future selections and not the past selection (although this could be modified in alternative embodiments). For example, if the user changes the range to 4 (from 10) after making a first color selection then the invention will use the new range value in modifying the look-up tables for the second and subsequent selections.

The invention then proceeds to step 323 in which the three look-up tables 401, 402, and 403 are modified (such as those look-up tables shown in FIG. 4*b*) to reflect the color selection from step 319. Specifically, in step 323, the value of 1 is written into the output side of each look-up table at the address in the look-up table which is equal to the computed average (from step 321) for each corresponding look-up table. Also, a 1 is written into the output side of each look-up table at all addresses from [average–range] to [average+range] for each corresponding look-up table. An example will be described to show step 323; assume that the range has been set at 10 and that the average colorimetric values computed in step 321 are: L=70: H=400; and S=90. The resulting look-up tables are shown in FIG. 4*b*. In particular, the L look-up table 421 has been modified from the original look-up table 401 by writing 1's into the locations 60 through 80 (inclusive). All other output locations of the look-up table retain the initialization value 0. Of course, it will be appreciated that other initialization values and other marking values may be used. Similarly, look-up table 422 has been modified from look-up table 402 by writing 1's into the range from 390 to 410. At this stage, if this selection was an additional selection to a previous color selection, there may be gaps in the look-up tables, so the method of the present invention proceeds to step 325 wherein gaps in the look-up tables (which will be described later), are filled. If this was the first selection, then there will be no gaps in the look-up table.

Figures 4D, 8:
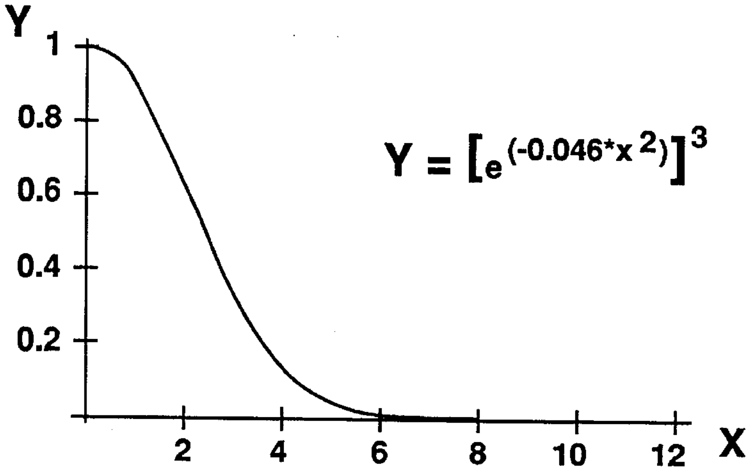

FIG. 4*c* shows an example of the look-up tables after the range has been modified and after a second selection of colors has taken place. For this example, the first selection is assumed to be as above, and the range is changed in step 313 to a value of 4. The look-up tables of 4*b* are modified during a second pass through step 323 wherein a 1 is written into the look-up tables at all addresses frown [average–range] to [average+range] for each corresponding look-up table to produce the look-up tables of FIG. 4*c*. In the example shown in FIG. 4*c*, the second color selection resulted in the following average colorimetric values: L=86; H=410; S=70. With the new range of 4, it can be seen that the L look-up table 431 has been modified by writing 1's into the locations from 82 to 90 (rather than from 76 to 96). The look-up tables 432 and 433 have had similar changes. After the second pass through step 323 (which results in the modified look-up tables shown in FIG. 4*c*), the invention proceeds through step 325 where gaps in the look-up tables of FIG. 4*c*. This involves standard computer science techniques in detecting gaps between two contiguous series of 1's. Thus, for example the gap in look-up table 431 at location 81 will be filled by writing a 1 into that location. Similarly, the gap at locations 75 through 79 in look-up table 433 will be filled by writing 1's into those locations 75 through and including 79. FIG. 4*d* shows the three look-up tables of FIG. 4*c* after filling the gaps. In the case of the Hue look-up table, the invention fills the table in one of two possible directions. Because Hue is an angular measure, the table is considered as a circular linear list where the addresses are modulo 1024, and the gaps between the markings are considered and filled such that the smaller of the two gaps is filled. Thus, the direction of filling will wrap-around from one end of the look-up table to the other end of the look-up table in the case of two contiguous blocks where the first contiguous block is, for example, from 10 to 20 and the other contiguous block is from 1010 to 1020 (in which case the locations from 0 to 9 and from 1020 to 1023 will be filled). The other possible direction of fill will be from the middle of the H look-up table towards the ends, and this is the same direction of filling for the L and S look-up tables.

Figure 5A:
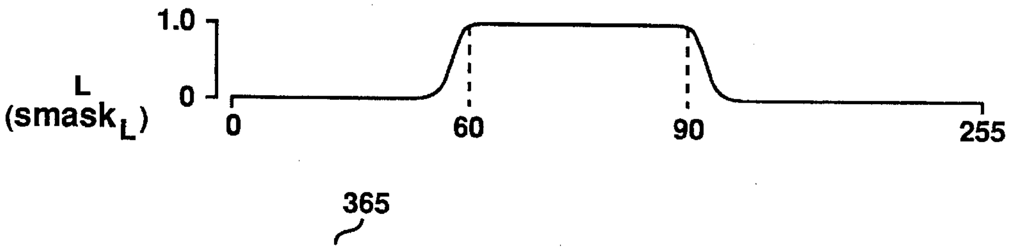
FIG. 5*a* shows a smooth look-up table which provides a smooth mask function for the L component of the LHS color space, where the L component is a colorimetric value in LHS color space.
Figure 5B:
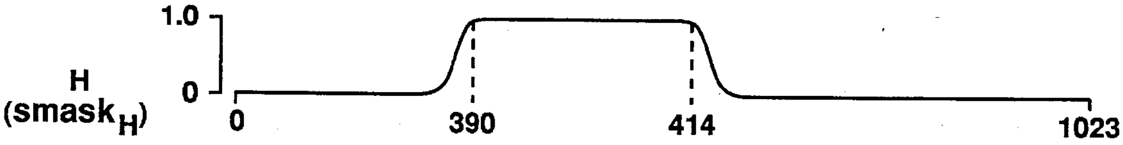
FIG. 5*b* shows a smooth look-up table which provides a smooth mask function for the H component of the LHS color space, where the H component is a colorimetric value in LHS color space.
Figure 5C:
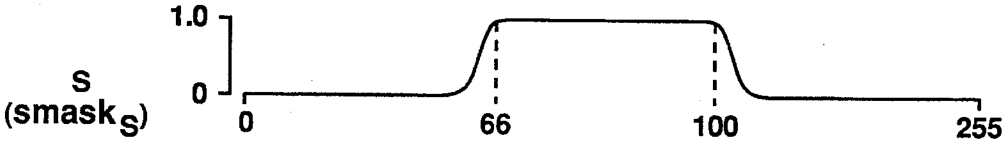
FIG. 5*c* shows a smooth look-up table which provides a smooth mask function for the S component of the LHS color space, where the S component is a colorimetric value in LHS color space.

Recall that the color masks define which colors are to be modified and they specify a region of color space. If a pixel has color L, H S such that each of the L, H and S masks is "1" for the color coordinates of this pixel, then that pixel is marked for modification. If any of these three masks is zero, then that pixel will not be modified. Hence colors even slightly different from colors at the edge of the mask will not be modified, while the slightly different color within the mask will be modified to the full extent to the required change. To avoid this suddenness of which colors are to be changed, a multiplicative factor is introduced to colors on either side of the masks so that there will not be this abrupt change in color changes of pixels that have close colors. The mechanism for doing this is to create in step 327 smooth mask look-up tables from the hard (filled) masks produced in step 325. This will now be described by referring to FIGS. 5*a*, 5*b*, and 5*c*. The edges of the contiguous regions containing 1's are smoothed by performing a transformation at the edges such that in the transformed region the values in the look-up table at the outer edges of the regions are quantized into fractional values as shown in FIGS. 5*a*, 5*b*, and 5*c*. The particular function which is used to smooth these edges is shown in FIG. 8 and is an exponential function: $y=[e-(0.046x^2)]^3$, where x=i–(upper boundary of contiguous 1's) and x=(lower boundary of contiguous 1's)–i and where "i" is the address into the binary mask LUT, such as LUT 431. In the case of LUT 431, the upper boundary is 90 and the lower boundary is 60. The output of this function is quantized into 16 bits yielding fractional values between 0.0 and 1.0. It can be seen that within the contiguous region of 1's, the value of the look-up table is set to 1.0 for each location; outside of that region, the value of the look-up table is a fraction which rapidly decreases as you move away from the edge of the contiguous region. The smoothing of the look-up tables will provide a more pleasing modification of colors in that closely related colors which fall outside of the region will be modified slightly rather than having an abrupt modification of some colors within the region and other closely related colors which are not modified. Note also that the smoothed masks (e.g. FIG. 5*a*) include colors not in the hard masks (e.g. FIG. 4*d*). The foregoing description of the smoothed masks is one of many possible embodiments. Other alternative embodiments include a smoothed mask where there is no smoothing outside of the mask but there is a gradual change from 0.0 to 1.0 from one end of the mask to the middle of the mask and then a gradual change from 1.0 to 0.0 from the middle to the other end of the mask. In another embodiment, the mask is smoothed such that colors inside and outside are modified differently; for example, inside the edges of the hard mask, the LUT mask may have a bell curve from a value less than 1.0 (e.g. 0.8) at one end to 1.0 at the middle to less than 1.0 at the other end, and outside of the edges of the hard mask, the values may have a step function or other smoothing techniques.

These smooth look-up tables provide smooth mask functions which represent a contiguous volume section (element)

or a color space. They will determine whether any given pixel in the image is modified (and by how much at the outside of the edges) by mapping the colorimetric values at any given pixel through the smooth mask represented by these smooth look-up tables as described in more detail below.

In an alternative embodiment, one could use different types of soft masks by using different types of weightings. For example, in an operation where Hue is less important, such as where one is working in grey scale, then the invention would modify the H and the S tables so that their value is less than 1.0 but leave the L table unscaled in order to minimize the affect of the H and S look-up tables on modifications. That is, each modification operation could have a special smooth mask set for L, H and S for that operation.

At this stage, the current selection of the masks is displayed in step 329 for the user to determine whether or not to add colors to the mask or if the mask contains all the necessary colors but covers too large a geometric area, to constrain the mask. The display mask operation is the same as the show mask choice made in step 305 which leads to step 312 and will be described below with the aid of FIG. 3*f*. After step 329 of displaying the mask, referring now back to FIG. 3*a* showing the overall flow chart, any necessary color changes are made in step 314, which is to be described in more detail below, then the changes are displayed on the screen in step 315. If the user is satisfied with the changes to the image, the image is saved. Otherwise, the user returns to step 305 of selecting the next tool.

Figure 3C:
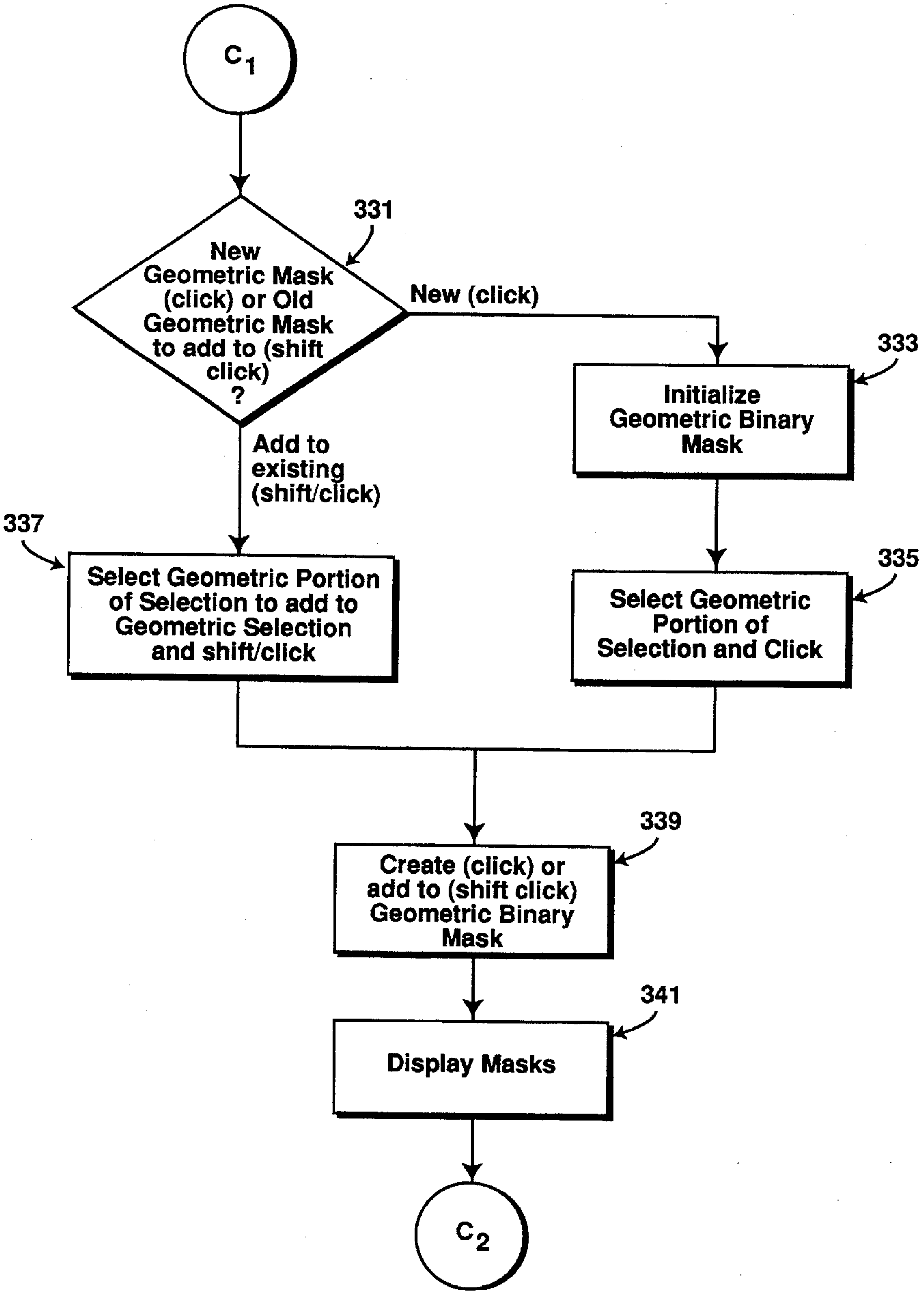
Figure 3D:
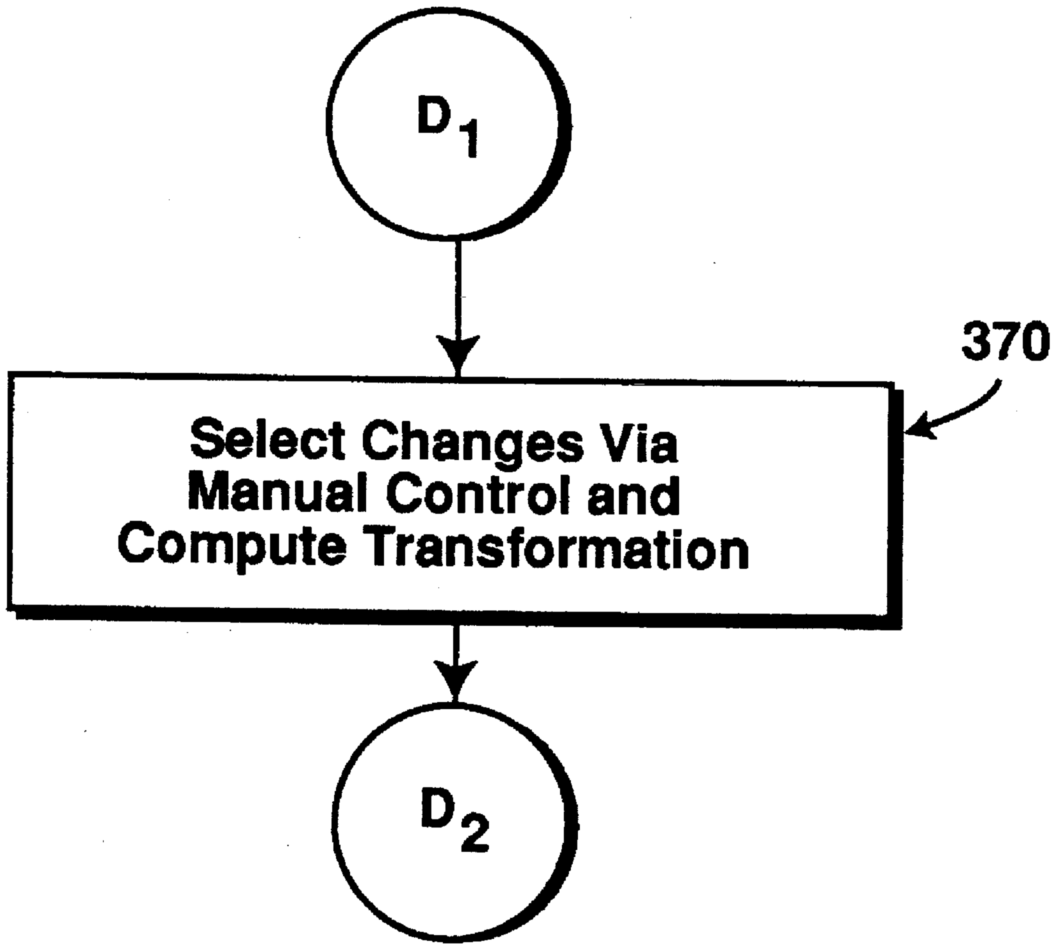
Figure 6:
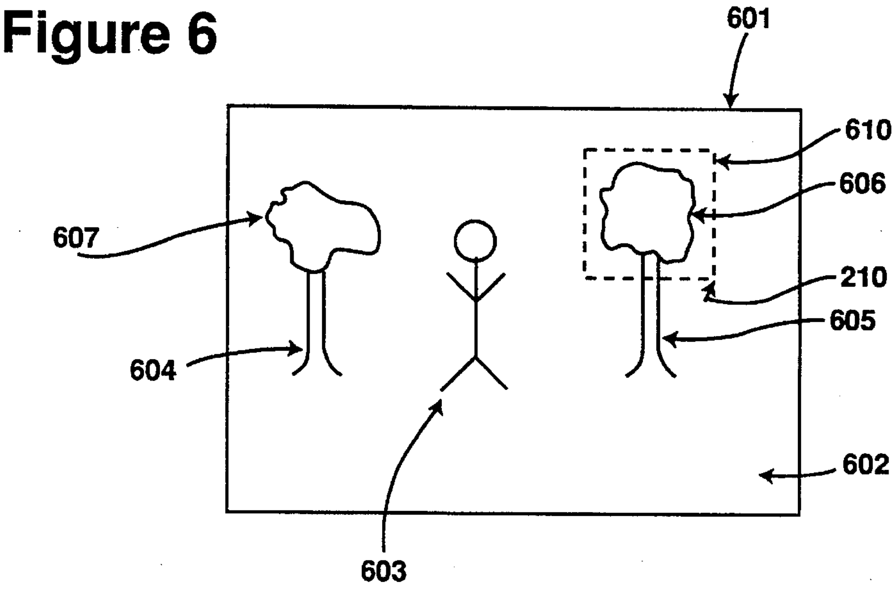
FIG. 6 shows an image displayed on a display device of the present invention where the modification of color has been geometrically constrained

The user may determine that it is necessary to geometrically constrain the selection or to add more geometric constraints to an already constrained image. This is step 308 in FIG. 3*a* and might occur, for example, if the mask contained all the necessary colors but covered too large a geometric area. FIG. 3*c* describes the process in the embodiment of the present invention for selecting or adding to a geometric constraint. The creation of a geometric binary mask begins by determining in step 331 whether or not this is the first geometric mask (a click on the mouse button in the preferred embodiment) or an addition to an existing mask (a click on the mouse button while holding down the shift key in the preferred embodiment). The implementation of the geometric constraint is well known in the art and may include the creation of a geometric binary mask which is a list of pixel addresses in a table with a corresponding 0 or 1 for each address. A "0" indicates that the pixel is not within the geometrically constrained area and a "1" indicates that the pixel is within a geometrically constrained area. If no mask yet exists, a mask with the whole space set to zero is created in step 333. Step 335 (a new mask) and step 337 (adding a mask to an existing mask) are the respective steps for selecting the geometric region. This may occur in any of the well known prior art techniques for geometrically constraining a selection. FIG. 6 shows an example of a geometric constraint by surrounding the region 606 (which represents the top of a tree 605) by surrounding the region 606 within a box 610. This geometric constraint may occur by the user positioning the cursor 210 at the upper left hand corner above the region 606 and then by dragging the cursor towards the lower right hand corner over the image while telling the computer to create a geometric constraint (e.g. by holding down the mouse button while dragging the cursor). This results in a rectangular selection region 610 which surrounds the desired region 606. Other geometric constraints include the well known lasso 719, shown in FIG. 7 or the circular selection tool 717 shown in FIG. 7. These tools may be used to geometrically constrain the selection of colors so that only region 606 in FIG. 6 is selected rather than region 606 and a similar green region 607 shown in FIG. 6. It will be appreciated that this tool will allow the selective modification of colors in one region while not affecting the same colors in other regions of the image. Once the geometric mask is created in step 339, the current selection reflecting the geometric constraint and the color selection is displayed on the screen in step 341. This is identical to step 329 previously mentioned in relation to FIG. 3*b*, and the same as the show mask operation 312 of FIG. 3*a* which will be explained below with the help of FIG. 3*f*. Referring back to FIG. 3*a* showing the overall flow chart, any necessary color changes are made in step 314, which is to be described in more detail below, then the changes are displayed on the screen in step 315. If the user is satisfied with the changes, the image is saved. Otherwise, the user returns to step 305 of selecting the next tool.

Once the region to be modified is selected, the user decides to modify the colors. The user chooses in step 309 whether the changes are to be made "conventionally" or by automatic means described below. If the user chooses to modify the colors by manual controls of such attributes as brightness, contrast, color cast, highlights, shadows, etc., using methods known in the art, then step 310 is performed whereby (see FIG. 3*d*) these changes are translated to the necessary transformation of the colors selected. If the user selects "automatic" color translation, the process 311 of determining the required color transformation is carried out as explained below with the aid of FIG. 3*e*. In the preferred embodiment of the present invention, such a choice is made by selecting the "eye dropper" icon 711 shown in FIG. 7 on the screen using a mouse or other pointing device as described below.

Figure 3E:
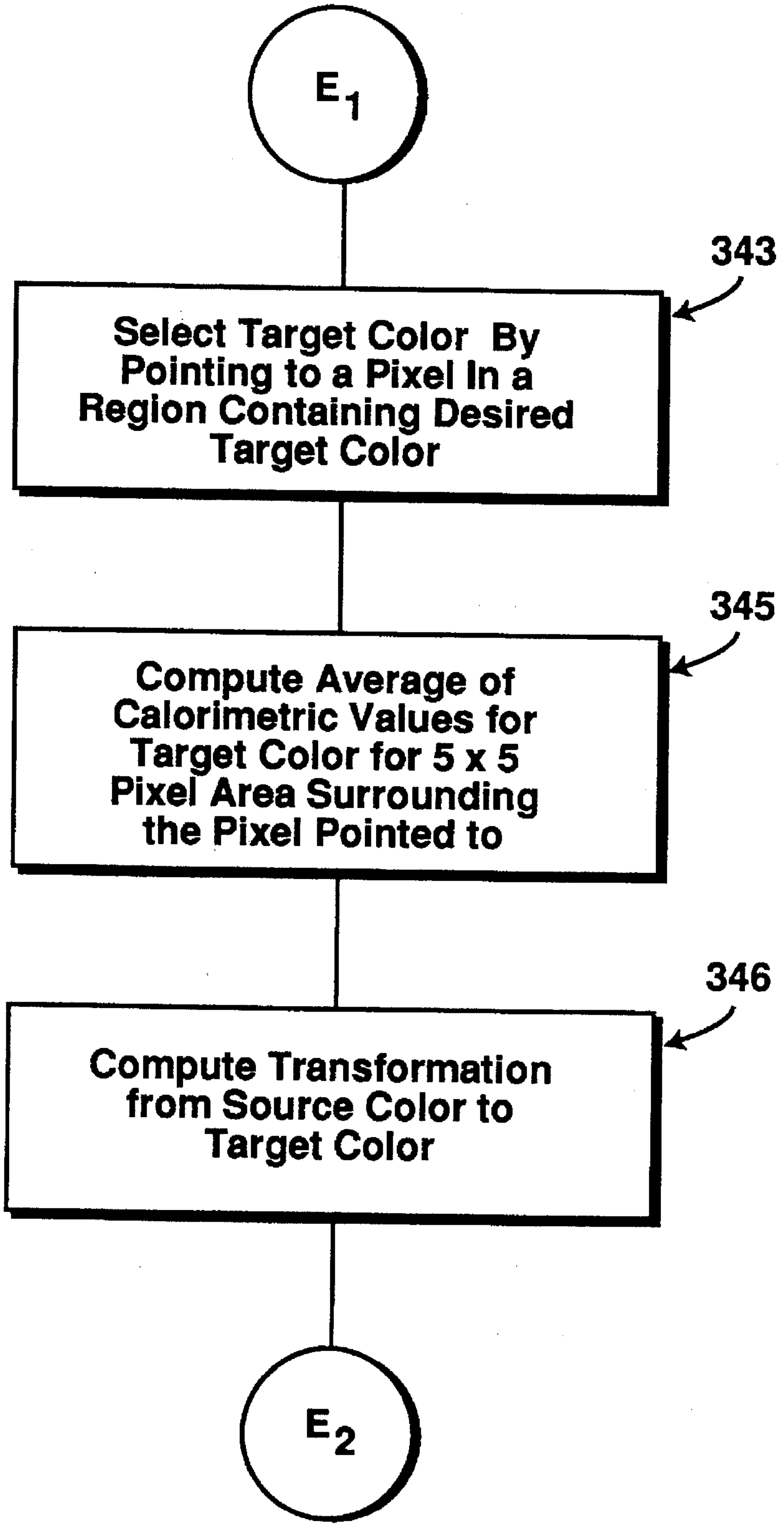
Figure 3F:
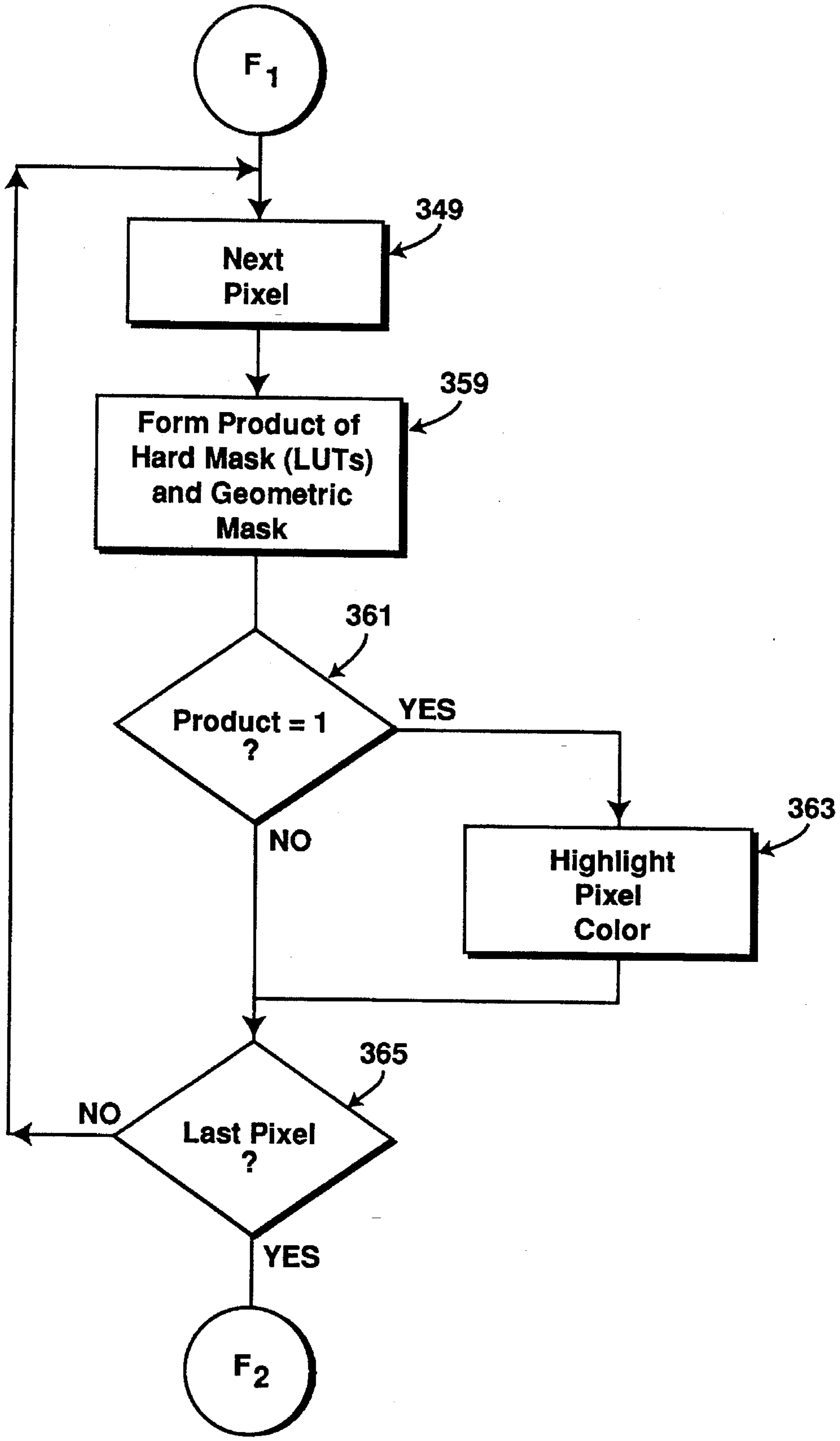
Figure 7:
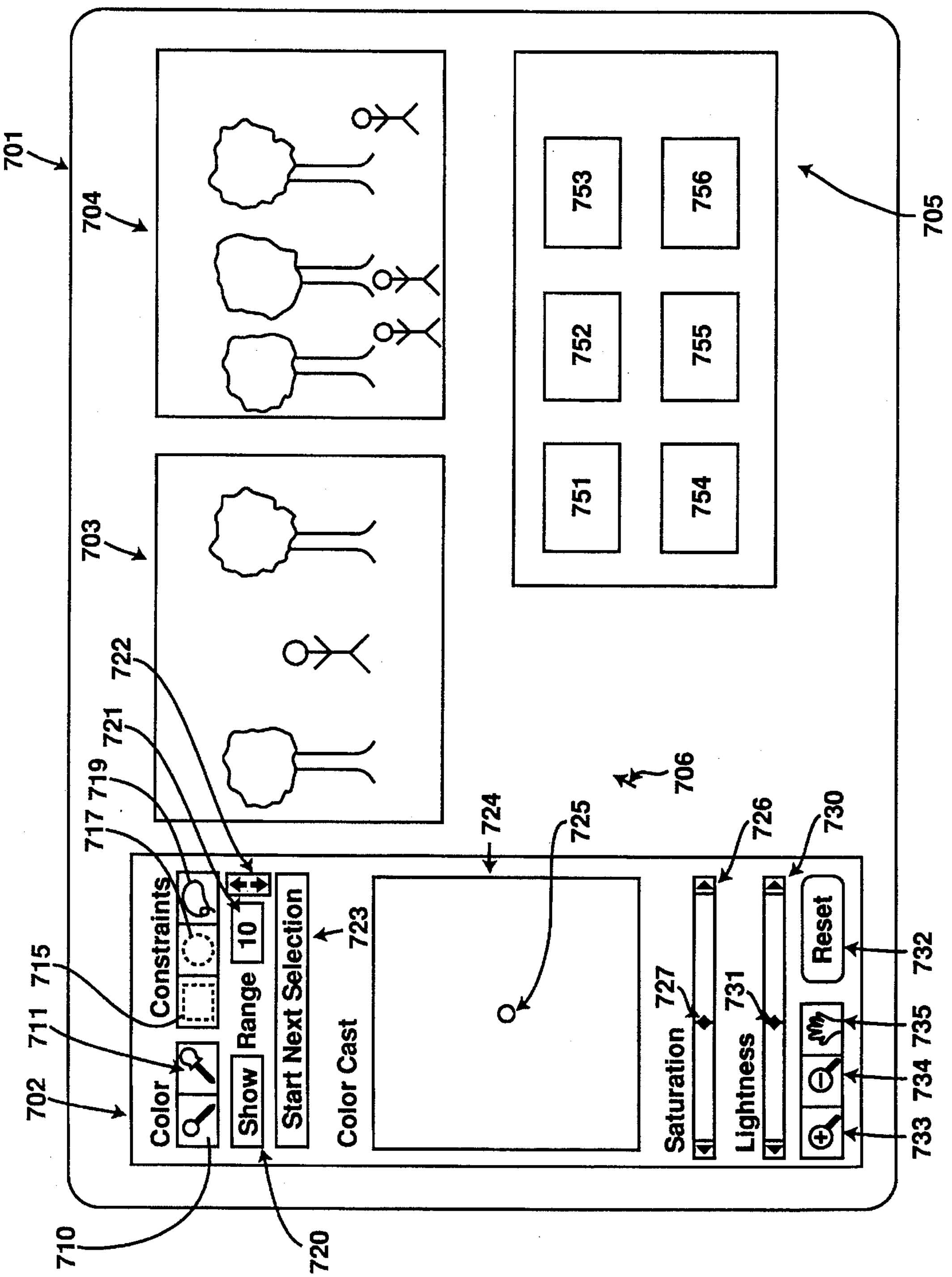
FIG. 7 shows the user interface of the present invention which appears on a;display device of the present invention.

Referring now to FIG. 3*e*, the user selects a target color by pointing to a pixel in a region containing the desired target color. In the example of FIG. 2, the user pointed to region 204 to select a more vivid green in order to modify the lighter (less vivid) greens in region 201. The selection of the target color in step 343 occurs in the same manner as described for the selection of the source color in step 319 in FIG. 3*b*. The target color may be selected from any portion of an image which contains color information. In the preferred embodiment, the user selects the eye dropper tool 711 as shown in FIG. 7 and points the tip of the eye dropper to the particular desired color. The user may point to a region of the user image 703 or any region of the reference image 704 or any color in a set of reference colors 705 such as the Pantone® reference colors 751 through 756 shown in FIG. 7. After the user selects the target color using any one of these techniques, the invention proceeds to step 345 in which the invention computes the average of the colorimetric values for the target color; in the preferred embodiment, the colorimetric values for the 25 pixels in a 5×5 pixel area surrounding the pixel pointed to by the cursor are used to compute this average. Following step 345, the user may then instruct the computer to compute the transformation from source color to target color, step 346 in FIG. 3*e*.

The step 314 in FIG. 3*a* of calculating the colorimetric values for step 346 for all modified colors using the smooth mask will now be described. This step may be implemented in several different ways depending upon the color system utilized and the manner in which the source and target colors are determined. Three examples will be presented below to show how the modified colorimetric values are determined.

Three different colors will be considered in this example to show the operation of the invention. In the first case (case 1), the color will be outside of all soft masks. In Case 2, the color will be squarely inside of all soft masks, and in Case 3, the color will have a colorimetric component at the smoothed outside edge of one of the soft masks. In these examples, the average colorimetric values for the first source selection shown in FIG. 4B will be used; thus, the source values (i.e. the "center" of the colors that will be changed) are $L_s$=70; $H_s$=400; and $S_s$=90. In an alternative embodiment, the source value could be the centroid (i.e. [max−min.]/2) of the contiguous soft mask region after all selections; using this embodiment and the example shown in FIG. 4C, the source values would be $L_s$=75; $H_s$=402; and $S_s$=83. Also in these examples, it will be assumed that the target color (selected in step 343 of FIG. 3*e*) has the following colorimetric values: $L_t$100; $H_t$=630; and $S_t$=60.

TABLE 1

| Case 1 | Case 2 | Case 3 |
|---|---|---|
| $L_1$ = 39 | $L_2$ = 74 | $L_3$ = 58 |
| $H_1$ = 100 | $H_2$ = 400 | $H_3$ = 400 |
| $S_1$ = 22 | $S_2$ = 83 | $S_3$ = 83 |
| $smask_L$ (L1) = 0.0 | $smask_L$ (L1) = 1.0 | $smask_L$ (L3) = 0.85 |
| $smask_H$ (H1) = 0.0 | $smask_H$ (H2) = 1.0 | $smask_H$ (H3) = 1.0 |
| $smask_S$ (S1) = 0.0 | $smask_S$ (S2) = 1.0 | $smask_S$ (S3) = 1.0 |

In Table 1, the colorimetric values for three cases are shown (prior to any modification by the invention) along with the values of each soft mask (smask) function for each corresponding colorimetric value. The soft mask functions used in Table 1 are from FIG. 5A (for the soft mask function for the L colorimetric coordinate— $smask_L$), FIG. 5B (for $smask_H$) and FIG. 5C (for $smask_S$). The product of all three soft mask functions for each color case will be used to determine how much change will occur for the particular color case. It will be appreciated that the invention processes all pixels in the image (unless an alternative geometric mask has been applied, in which case only a portion of the pixels based on the location of the pixels are processed) by determining the product of the three smask functions for the three colorimetric values of each pixel. It can be seen from Table 1 that the $smask_L$ for $L_1$ is zero (applying 30 to the smask function of FIG. 5A produces a "0") while the $smask_L$ for $L_3$ is about 0.85. In the functions shown below, it will be appreciated that "*" represents the multiplication operation.

The preferred embodiment of the invention determines the new colorimetric values for each pixel in the user image according to the following functions:

Note that for any given pixel at location ij, $$productsmask=smask_L(L_{ij})*smask_H(H_{ij})*smask_S(S_{ij});$$

thus the new L for any given pixel is:

$$L_{new} \text{ at } ij=(\text{geometric mask } ij)*productsmask*(L_T-L_S)+Lold\ ij.$$

Similarly, the new H for any given pixel is:

$$H_{new} \text{ at } ij=(\text{geometric mask}ij)*productsmask*(H_T-H_S)+H_{oldij};$$

and the new S for any given pixel is:

$$S \text{ new at } ij=[\{(\text{geometric mask}ij)*productsmask*[(S_T/S_S)-1]\}+1]*S_{oldij}.$$

the case when $S_S$=0 (ie, grey source) handled in the subtractive way as for H. Note that if any of the masks is zero, then as required, one sets Snew=Sold for pixel ij.

An alternative method for computing L is:

$$Lnew \text{ at } ij=[\{(\text{geometric mask}ij)*productsmask*[(L_T/L_S)-1]\}+1]*L_{oldij}.$$

Again, $L_S$=0 is handled as the subtractive way.

The geometric mask is a binary function (implemented for example in a LUT) having an input of the pixel's address and an output of a "1" if the pixel is within the geometric constraint or "0" if outside. The computation of new values according to these functions for case 3 is shown below:

$$L_{new} \text{ for case } 3 = (1)*(0.85)*(1.0)*(1.0)*(100-70)+58 = (0.85)*(30)+58 = 83.5$$

$$H_{new} \text{ for case } 3 = (1)*(0.85)*(1.0)*(1.0)*(630-400)+400 = (0.85)*(230)+400 = 595.5$$

$$S_{new} \text{ for case } 3 = [\{(1)*(0.85)*(1.0)*(1.0)[(60/90)-1]\}+1.0]*83 = 59.48.$$

The three different color cases result in the following modifications:

| New Case 1 | New Case 2 | New Case 3 |
|---|---|---|
| $L_1$ = 39 | $L_2$ = 104 | $L_3$ = 83.5 |
| $H_1$ = 100 | $H_2$ = 630 | $H_3$ = 595.5 |
| $S_1$ = 22 | $S_2$ = 55.33 | $S_3$ = 59.48 |

Because final values are 8-bit, 10-bits and 8-bit integers, respectively, of L, H and S, respectively, any non integer values are rounded into integers.

At this stage, the new pixels (having their modified colorimetric values) will be displayed as shown in step 315. Note that if the pixel to be considered has as its LHS values the source values $L_S$, $H_S$ and $S_S$, then the method of "automatically" translating colors of FIG. 3*e* would change the pixel's color values to the target values $L_T$, $H_T$ and $S_T$, as one would expect intuitively.

In the "Pick tool" operation shown in FIG. 3*a* as step 305, the user might select to show on the user image those pixels currently marked for correction. The process 312 of highlighting those pixels of the selection is described in FIG. 3*f*. This is also the steps 329 in FIG. 3*b* and 341 in FIG. 3*c* of displaying the selection during the steps of adding to the color selection of the geometric constraint. For every pixel in the image, this indicated by steps 349 and 365 of FIG. 3*f*, the following operations are performed. The product is formed 359 of the color selection look-up tables (hard color masks) of step 325 of FIG. 3*b* and the geometric masks of step 339 of FIG. 3*c*. If one of these masks does not exist, a value of 0 is assumed for the color mask and a value of zero for the geometric mask. It is then determined 361 whether or not the product is 1. If 1, that pixel is highlighted. This continues until all pixels have been processed.

The apparatus of the present invention modifies a color in an image as described above. The apparatus includes a display device such as device 101 for displaying the image, where the image is comprised by a plurality of pixels on the display device. The apparatus further includes a cursor positioning device, such a mouse 108 for pointing the cursor to at least one pixel of the image to select a color. The apparatus further includes a means for selecting at least one color which is representative of at least one pixel in the image, where this means for selection comprises a means for determining a region of a color space which is representative of a portion of the image near at least the one pixel previously selected ("selected region" of color space). The means for selection and the means for determining typically includes a CPU 104 as well as memory 106. The apparatus further includes a memory means such as RAM 106 for storing data representative of the volume element and for storing data representative of the second color which is the target color. The apparatus of the present invention typically further includes a data processing means such as a CPU 104 which is coupled to the cursor positioning device 108 and to the display device 101 and to the memory means 106. The data processing device such as the CPU 104 modifies the colorimetric values of the selected colors associated with the volume element typically by building up the smooth look-up tables which have been described above.

The present invention also provides an improved method and apparatus for allowing the user to interactively (by observing the display) select certain colors for selective color correction (modification) and also allows the user to add interactively to the selected range of colors to create a contiguous region of the color space (as specified by the smask means) which is representative of a portion of the image. The user interface of the present invention is shown generally in FIG. 7. The display device 101 has a screen 701 which displays various windows including the selective color tool window 702, the user image window 703, the reference image window 704, and the set of reference colors window 705. The tools allowing the user to selectively modify colors in the user image are contained in the selective tool window 702 and these tools are used to modify colors in the image shown in the user image window 703. The selective color tool window 702 includes a tool 710 for selecting a source color (step 319) and a tool (eye dropper tool) 711 to select the target color (step 343). The user may use the shift key on the keyboard to select additional regions when using either tool by holding down the shift key when pointing and clicking with a tool. The use of a select tool such as tool 710 or 711 to select a region without holding down the shift key will create a new selection and undo the prior selection(s). The user can also use the command key (holding it down while pointing and clicking with select tool 710 or 711) to remove a previous selection from the current selected regions. Geometric constraint tools 715, 717 and 719 may be used to geometrically constrain selected colors as described above (step 308). The range selection tool 721 and 722 may be used to modify the range step size which is used to determine the size of the incremental region of color space selected by each step in the process to generate the look-up tables in FIG. 4*c* and in FIGS. 5*a*, 5*b* and 5*c*. The user manipulates the cursor positioning device 108 to position the cursor 706 in FIG. 7 near the up or down arrows in the range tool 722 to modify the range step size which is displayed in the range tool 721 (step 313). The tool window 702 further includes tools 733 and 734 which may be used to magnify or demagnify the image displayed in a window and tool 735 which may be used to move the image around the window. The reset button 732 allows the user to reset (and hence undo) selections which were made which will also reinitialize the binary look-up tables to the state as shown in FIG. 4*a*. The show button region 720 will cause the show masks operation 312 of FIG. 3*a*.

A typical use of the invention will now be described by referring to FIG. 7. The user begins typically by causing the computer system to display the user image, which is typically displayed on the screen of the display device in a region referred to as a window. The user image window 703, as shown in FIG. 7, depicts a natural scene having two trees and a person. The user then causes the computer system to display the selective color tool window 702 by invoking well known operating system techniques to display a region of the screen which represents the tool window 702. The user then selects the source color selection tool 710 by pointing the cursor 706 to that tool and by signalling to the computer (e.g. by clicking the mouse button) that a selection of that tool has been made. The user then moves an icon of the tool 710 over to the user image 703 to select a color in that image 703. If the user desires to modify the green color of the tops of trees, the user would move the tool 710 over to the tops of the trees in image 703 to select that color region. The colors are selected by virtue of the creation of the smooth masks in step 327. The pixels in user image 703 which have colors selected are highlighted on the display. If the user wishes to add to these colors, because, for example, not all of the tops of trees were selected, colors can be added by repeating the process. That is, the user would move the tool 710 over to the tops of the trees in image 703 to a region not yet selected to select that color region as well. If now it is determined that too many regions of the image have the selected colors, the geometric constraints can be added using constraints tools 717.

After the selection has been made (which is step 307 of FIG. 3*a*, with details in FIG. 3*b*), the user can interactively modify (manually, as in step 310 of FIG. 3*a*) any of the three coordinates of a color space for the colors which were selected. The selected modification of a singular coordinate, such as color cast (Hue) may occur by the user manipulating the circle 725 within the color cast window 724 to change the Hue of the selected green colors in image 703. Similarly, the user could modify the saturation of those selected colors only by moving the saturation pointer 727 or by activating the arrows at the extremes of the saturation bar 726; activation may occur by, for example, pointing the cursor to either arrow at the end of bar 727 and signalling to the computer that a selection of one of those arrows has occurred. The invention will then cause the pointer 727 to move the corresponding amount which is dependent on how long the user activates the arrows at the extreme ends of the saturation bar 726. In a similar fashion, the user may modify the lightness of the selected color by using the pointer 731 or the arrows at the ends of the lightness bar 730.

After selecting at least one color in the user image in window 703, the user may then select a target color by using the eye dropper tool 711 to select a target color from any location containing color information, such as the user window 703, the reference image window 704 or the set of reference colors in the window 705. For example, the user may position the cursor 706 over the eye dropper tool 711 to select that tool and then move that tool to the window 705 to pick the reference color 752, which may be one color in the Pantone® set of reference colors. After selecting the target color using the selection tool 711, the user may then show the resulting modification by selecting the show button 720, which causes the computer to execute step 315 of FIG. 3*a* to thereby display the modified colors in the user image 703.

The present invention has been described in light of the preferred embodiment but it will be clear to those in the art that many modifications can be made to the present invention. For example, the order of steps in the method shown in FIG. 3 may be modified without affecting the performance of the invention. Moreover, the present invention may be implemented for grey scale images as noted above to modify at least one grey shade to have it match another grey shade.

We claim:

1. A method for modifying a first plurality of pixels in an image, said image comprising a plurality of pixels, said method comprising:

displaying said image on a display device;

interactively selecting at least one pixel of said image;

determining the colorimetric values representative of said at least one pixel and determining a contiguous volume of a color space, said contiguous volume defined by said colorimetric values representative of said at least one pixel and by a predetermined range;

determining a source color representative of said contiguous volume;

determining said first plurality of pixels in said image, said first plurality of pixels consisting of all pixels in said image having colors in said contiguous volume, said first plurality of pixels having a shading and texture and having a predetermined relationship corresponding to said shading and texture;

selecting a second pixel and determining the colorimetric values representative of said second pixel wherein said second pixel represents a target color;

calculating an automatic color transformation for approximately transforming said source color to said target color;

modifying the colorimetric values of all pixels of said first plurality of pixels by applying said automatic color transformation to create a modified plurality of pixels such that pixels of said first plurality of pixels are changed to pixels of said modified plurality that have a relationship which is similar to said predetermined relationship such that said shading and texture are preserved.

2. A method as in claim 1 wherein said step of selecting said second pixel is carried out interactively.

3. A method as in claim 2 wherein all pixels of said image have the colorimetric values examined to determined whether to modify the colorimetric values.

4. A method as in claim 2 wherein said second pixel is selected by pointing a cursor on said display device to a first region from one of said image and a reference image and a color in a set of reference colors being displayed on said display device.

5. A method as in claim 4 wherein if said second color is selected by pointing said cursor to said first region of said reference image, said second color is determined by averaging the colorimetric values of all of the pixels in said first region of said reference image.

6. A method as in claim 4 wherein said set of reference colors is a set of Pantone colors.

7. A method as in claim 2 further comprising interactively selecting a further pixel from a further region of said image.

8. A method as in claim 7 wherein said step of interactively selecting a further pixel increases the volume of said contiguous volume to provide a modified contiguous volume and determining a modified source color representative of said modified contiguous volume, and wherein said first plurality of pixels consist of all pixels in said image having colors in said modified contiguous volume, and wherein said automatic color transformation approximately transforms said modified source color to said target color.

9. A method as in claim 7 wherein said step of interactively selecting a further pixel decreases the volume of said contiguous volume to provide a modified contiguous volume and determining a modified source color representative of said modified contiguous volume, and wherein said first plurality of pixels consist of all pixels in said image having colors in said modified contiguous volume, and wherein said automatic color transformation approximately transforms said modified source color to said target color.

10. A method as in claim 2 wherein said at least one pixel is selected by pointing a cursor on said display device at said at least one pixel.

11. A method as in claim 2 wherein said at least one color is selected by pointing a cursor on said display device at a second region.

12. A method as in claim 2 wherein said step of determining said source color comprises averaging the colorimetric values of said contiguous volume.

13. A method as in claim 2 wherein said step of determining said source color comprises determining the median colorimetric values of all pixels in said first plurality.

14. A method as in claim 2 wherein said step of determining said colorimetric values representative of said at least one pixel comprises averaging the colorimetric values of pixels neighboring said at least one pixel.

15. A method as in claim 2 wherein said predetermined range may be modified and wherein an indicator for said range is displayed on said display device.

16. A method as in claim 2 wherein said first plurality of pixels are highlighted on said display such that a user can observe which pixels in said image are selected for modification.

17. A method as in claim 2 wherein said contiguous volume defines a color mask, said color mask comprising boundaries which define colorimetric ranges, wherein said ranges are within said boundaries.

18. A method as in claim 2 further comprising:

enlarging said contiguous volume to define an enlarged contiguous volume in said color space;

determining a second plurality of pixels, said second plurality consisting of all pixels that have colorimetric values in said enlarged volume and that are not in said first plurality of pixels;

modifying the pixels in said second plurality such that the color of a particular pixel in said second plurality is modified by an amount determined by said automatic color transformation multiplied by a factor determined by the color distance of the color of said particular pixel from the closest color in said contiguous volume.

19. A method as in claim 2 wherein said contiguous volume defines a color mask, said color mask comprising boundaries which define colorimetric ranges, wherein said ranges are within said boundaries, said method further comprising smoothing said color mask to create a smoothed color mask and wherein said automatic color transformation uses said smoothed color mask to modify the colorimetric values of said first plurality of pixels.

20. A method as in claim 1 further comprising the step of selecting a geometrically constrained region of said image, wherein said first plurality of pixels consists of all pixels having colors in said contiguous volume and further being within said geometrically constrained region of said image.

21. A method as in claim 20 wherein said step of selecting said second pixel is carried out interactively.

22. A method as in claim 21 wherein all pixels of said image have their colorimetric values examined to determine whether to modify their colorimetric values.

23. A method as in claim 21 wherein said second pixel is selected by pointing a cursor on said display device to a first region from one of said image and a reference image and a color in a set of reference colors being displayed on said display device.

24. A method as in claim 23 wherein if said second color is selected by pointing said cursor to said first region of said reference image, said second color is determined by averaging the colorimetric values of all of the pixels in said first region of said reference image.

25. A method as in claim 23 wherein said set of reference colors is a set of Pantone colors.

26. A method as in claim 21 further comprising interactively selecting a further pixel from a further region of said image.

27. A method as in claim 26 wherein said step of interactively selecting a further pixel increases the volume of said contiguous volume to provide a modified contiguous volume and determining a modified source color representative of said modified contiguous volume, and wherein said first plurality of pixels consist of all pixels within said geometrically constrained region in said image having colors in said modified contiguous volume, and wherein said automatic color transformation approximately transforms said modified source color to said target color.

28. A method as in claim 26 wherein said step of interactively selecting a further pixel decreases the volume of said contiguous volume to provide a modified contiguous volume and determining a modified source color representative of said modified contiguous volume, and wherein said first plurality of pixels consist of all pixels within said geometrically constrained region in said image having colors in said modified contiguous volume, and wherein said automatic color transformation approximately transforms said modified source color to said target color.

29. A method as in claim 21 wherein said at least one pixel is selected by pointing a cursor on said display device at said at least one pixel.

30. A method as in claim 21 wherein said at least one color is selected by pointing a cursor on said display device at a second region.

31. A method as in claim 21 wherein said step of determining said source color comprises averaging the colorimetric values of said contiguous volume.

32. A method as in claim 21 wherein said step of determining said source color comprises determining the median colorimetric values of all pixels in said first plurality.

33. A method as in claim 21 wherein said step of determining said colorimetric values representative of said at least one pixel comprises averaging the colorimetric values of pixels neighboring said at least one pixel.

34. A method as in claim 21 wherein said predetermined range may be modified and wherein an indicator for said range is displayed on said display device.

35. A method as in claim 21 wherein said first plurality of pixels are highlighted on said display such that a user can observe which pixels in said image are selected for modification.

36. A method as in claim 21 wherein said contiguous volume defines a color mask, said color mask comprising boundaries which define colorimetric ranges, wherein said ranges are within said boundaries.

37. A method as in claim 21 further comprising:

enlarging said contiguous volume to define an enlarged contiguous volume in said color space;

determining a second plurality of pixels, said second plurality consisting of all pixels that have colorimetric values in said enlarged volume and that are not in said first plurality of pixels;

modifying the pixels in said second plurality such that the color of a particular pixel in said second plurality is modified by an amount determined by said automatic color transformation multiplied by a factor determined by the color distance of the color of said particular pixel from the closest color in said contiguous volume.

38. A method as in claim 21 wherein said contiguous volume defines a color mask, said color mask comprising boundaries which define colorimetric ranges within said boundaries, further comprising smoothing said color mask to create a smoothed color mask and wherein said automatic color transformation uses said smoothed color mask to modify the colorimetric values of said first plurality of pixels.

39. An apparatus for modifying pixels in an image displayed by a display system, said apparatus comprising:

a display device for displaying said image, said display device being coupled to said display system, said image being comprised by a plurality of pixels displayed on said display device;

a means for interactively selecting at least one pixel;

a means for determining the colorimetric values representative of said at least one pixel and for determining a contiguous volume of a color space, said contiguous volume defined by said colorimetric values representative of said at least one pixel and by a predetermined range;

a means for determining a source color representative of said contiguous volume;

a means for determining a first plurality of pixels in said image, said first plurality of pixels consisting of all pixels in said image having colors in said contiguous volume, said first plurality of pixels having a shading and texture and having a predetermined relationship relative among each other, said predetermined relationship corresponding to said shading and texture;

a means for selecting a second pixel and determining the colorimetric values representative of said second pixel, wherein said pixel represents a target color;

a means for calculating an automatic color transformation for approximately transforming said source color to said target color;

a means for modifying the colorimetric values of all pixels of said first plurality of pixels by applying said automatic color transformation to create a modified plurality of pixels such that pixels of said first plurality are changed to pixels of said modified plurality that have a relationship which is similar to said predetermined relationship such that said shading and texture are preserved.

40. An apparatus as in claim 39 further comprising a data processing means coupled to said display device and a memory means for storing the colorimetric values representive of said at least one pixel and said second pixel.

41. An apparatus as in claim 39 wherein said means for interactively selecting at least one pixel comprises a cursor positioning device, and wherein said second pixel is interactively selected by said cursor positioning device.

42. An apparatus as in claim 39 further comprising a means for selecting a geometrically constrained region of said image, wherein said first plurality of pixels consists of all pixels having colors in said contiguous volume and further being within said geometrically constrained region of said image.

43. An apparatus as in claim 42 further comprising a data processing means coupled to said display device and a memory means for storing the colorimetric values representative of said at least one pixel and said second pixel.

44. An apparatus as in claim 42 wherein said means for interactively selecting at least one pixel comprises a cursor positioning device, and wherein said second pixel is interactively selected by said cursor positioning device.

45. An apparatus as in claim 39 further comprising a means for selecting a geometrically constrained region of said image, wherein said first plurality of pixels consists of all pixels having colors in said contiguous volume and further being within said geometrically constrained region of said image.

46. An apparatus as in claim 45 wherein said data processor determines a plurality of smoothed look-up tables which provide a mask in said color space.

47. An apparatus as in claim 46 wherein said plurality of smoothed look-up tables comprises three look-up tables for said color space of said image.

48. An apparatus for modifying a color in an image displayed by a computer controlled display system, said apparatus comprising:

a display device for displaying said image, said image being comprised by a plurality of pixels;

a cursor positioning device for pointing to at least one pixel;

a means for determining the colorimetric values being representative of said at least one pixel and for determining a contiguous volume element of a color space, said contiguous volume element defined by said colorimetric values representative of said at least one pixel and by a range;

a memory storing data representative of said contiguous volume element and storing data representative of a source color which is representative of said contiguous volume element;

a means for selecting a second pixel and determining the colorimetric values representative of said second pixel wherein said second pixel represents a target color;

a data processor being coupled to said cursor positioning device and to said display device and to said memory and to said means for determining the colorimetric values, said data processor determining a first plurality of pixels in said image, said first plurality of pixels consisting of all pixels in said image having colors in said contiguous volume, said first plurality of pixels having a shading and texture and having a predetermined relationship relative among each other, said relationship corresponding to said shading and texture, said data processor calculating an automatic color transformation for approximately transforming said source color to said target color, said data processor modifying the colorimetric values of all pixels of said first plurality of pixels by applying said automatic color transformation to create a modified plurality of pixels such that pixels of said first plurality are changed to pixels of said modified plurality that have a relationship which is similar to said predetermined relationship such that said shading and texture are preserved.

49. An apparatus as in claim 48 wherein said data processor determines a plurality of smoothed look-up tables which provide a mask in said color space.

50. An apparatus as in claim 49 wherein said plurality of smoothed look-up tables comprises three look-up tables for said color space of said image.

* * * * *